United States Patent [19]
Bünger et al.

[11] 3,779,783
[45] Dec. 18, 1973

[54] MELTABLE COATING COMPOSITIONS, PARTICULARLY FOR FOODSTUFFS AND PHARMACEUTICAL PREPARATIONS

[75] Inventors: Heinrich Bünger; Gustav Renckhoff, both of Witten-Bommern, Germany

[73] Assignee: Dynamit Nobel AG, Troisdorf, Germany

[22] Filed: June 18, 1971

[21] Appl. No.: 154,623

[30] Foreign Application Priority Data
Dec. 30, 1970 Germany.................. P 20 64 373.6
June 20, 1970 Germany.................. P 20 30 429.4

[52] U.S. Cl.................. 106/171, 99/166, 106/180, 117/166, 424/35
[51] Int. Cl. .................................................. C08b
[58] Field of Search............................ 106/171, 180; 99/166; 424/35; 117/166

[56] References Cited
UNITED STATES PATENTS
2,745,749   5/1956   Feuge et al. ................. 99/166
3,000,748   9/1961   Clark .................... 106/180
3,471,304  10/1969   Hamdy et al. ............. 106/171 X Primary Examiner—Allan Lieberman
Assistant Examiner—H. H. Fletcher
Attorney—Craig, Antonelli et al.

[57] ABSTRACT

A coating composition especially suitable for foodstuffs and pharmaceutical preparations which comprises an acylated glyceride having an iodine value below 12 admixed in certain proportions with a cellulose propionate having an acetyl content less than about 6% by weight, a hydroxyl content less than about 3.0% by weight and a content of acyl groups having more than 3 carbon atoms of less than about 10% by weight.

13 Claims, No Drawings

MELTABLE COATING COMPOSITIONS, PARTICULARLY FOR FOODSTUFFS AND PHARMACEUTICAL PREPARATIONS

This invention relates to coating compositions containing glycerides as a base, particularly coatings for foodstuffs and pharmaceutical preparations. The coating can be readily applied by dipping the items to be coated into the molten composition, or by spraying the composition onto the items to be coated. This coating protects the covered items from, for example, moisture loss, the effects of oxygen, discoloration, contamination, and against the attack of microorganisms.

There is an increasing demand for coating compositions which must meet certain requirements, i.e., the compositions are such that they are physiologically acceptable; they exhibit a high resistance to oxidation at a relatively low melting point; they are not tacky, sticky, or exude oily matter; they are little impervious to steam and oxygen; they are tasteless and odorless; they can be readily applied in the required layer thickness by dipping at temperatures which are not too high; and they result in coatings exhibiting sufficient permanent flexural strength. The two last-mentioned properties have special importance in practical applications, and the coating compositions known heretofore have not been able to meet these requirements to a sufficient extent.

It is known to esterify partial glycerides with lower fatty acids of 2-4 carbon atoms and to employ the resultant products as coating compositions. (See Ault, W. C.; Reimenschneider, R.W.; Feuge, R.O.; and Cowan, J.C.: *Food Engineering*, Vol. 25 (1953), No. 6, pp. 99–103, and Feuge, R.O.: *Food Technology*, Vol. 9 (1955), pp. 314–8.)

It is likewise conventional to modify such products by various additives; for example, the suggestion has been advanced to mix acetylated monostearin (i.e., glycerol monostearate) or acetylated monopalmitin with zein and a solvent in order to obtain (subsequently, after removal of the solvent) a protective coating for confections. Furthrermore, it has been suggested to mix ethylcellulose, mineral oil, monoglycerides, and castor oil with acetylated monoglycerides and to utilize the mixture as a meltable, solvent-free coating composition for foodstuffs. Another suggestion recommends the addition of about 15–60% by weight of a cellulose ester with an acetyl content of more than 6%, preferably more than 10% by weight, to unsaturated partial glycerides of longer chain fatty acids, which partial glycerides are substituted by lower fatty acid esters; and the use of this mixture as a coating for foodstuffs (German Published Applicaton DAS 1,178,539).

However, none of the products proposed heretofore meets the practical requirements to a satisfactory degree. It is either necessary to employ a solvent for the application of the coating, or the physiological properties are impaired by the addition of a mineral oil, or the molten products must be applied to the foodstuffs at temperatures which are too high since the viscosity of such products is too high at moderate temperatures. Some of these viscous products can be applied only by spraying, since the melt, at the temperatures tolerated by the food item, does not run off the item after dipping to the desired extent and thus the coatings become too thick and non-uniform. Others of the products known heretofore contain considerable amounts of unsaturated fatty acids bound in ester form which, consequently, are sensitive to oxidation and assume a rancid odor after a relatively long storage period. In many cases, such unsaturated components are liquid and thus can exude as an oily substance from the gel-type coating composition when stored for a long period of time. Products having a sufficient permanent flexural strength, a low processing temperature, and a low viscosity of the melt, which do not exhibit a rancid odor even after a longer storage time and which, due to a lack of liquid components, cannot exude as an oily substance, have not been known heretofore.

In accordance with this invention, it has now been found that it is possible to obtain coating compositions fulfilling all necessary requirements without exhibiting the above-described disadvantages by dissolving, in a completely saturated, or slightly unsaturated, glyceride containing acetyl and/or propionyl groups, or in mixtures of such glycerides, about 0.05 to about 12.0% by weight, preferably about 0.2 to about 9.0% by weight, of cellulose propionate having a content of less than about 6% by weight of acetyl groups. The cellulose propionate can also be mixed with a suitable monoglyceride, and this mixture can be acetylated in a conventional manner, to provide the necessary acetyl groups wherein the same coating composition is obtained.

Thus, this invention contemplates coating compositions having a glyceride base, resulting in odor-stable, meltable coatings of a high permanent flexural strength and exhibiting a low viscosity in the melt, particularly for foodstuffs and pharmaceutical preparations, characterized in that the compositions contain, in addition to a glyceride having an iodine number of below 12 of the general formula below:

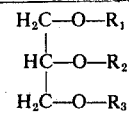

wherein, at least one of the residues $R_1$, $R_2$ or $R_3$ represents an acetyl group or a propionyl group and at least another of these residues represents an acyl group containing 16 to 24 carbon atoms; and wherein, optionally, one of the residues $R_1$, $R_2$, or $R_3$ can also be hydrogen, about 0.05 to about 12.0% by weight, preferably about 0.2 to about 9.0% by weight, of cellulose propionate (i.e., cellulose acetate propionate) having an acetyl content of less than about 6.0% by weight, a hydroxyl content of less than about 3.0% by weight, and a content of acyl groups of more than about 3 carbon atoms of less than about 10% by weight. Suitably, glycerides having an iodine number of below 3 are employed. Also, it will be understood that the glycerides as represented in the above formula must have at least an acetyl or propionyl group and at least an acyl group of the longer chain acids.

The cellulose propionate employed can be a commercially available product with an acetyl content of less than 6.0% by weight, a hydroxyl content of less than 3.0% by weight, and a content of butyryl and longer acyl groups of less than 10% by weight.

The advantages attainable by the present invention reside particularly in that, in contrast to the previously known products, the molten solvent-free coating composition of the invention has a sufficiently low viscosity and a superior permanent flexural strength is obtained in the solid composition. Due to the low viscosity of the melts, the melts can be applied at temperatures of below 90° C.; this aspect is of special significance for temperature-sensitive foodstuffs which can now be coated by dipping into the melt without any disadvantage whatsoever. The films of the invention also adhere to the foodstuffs, but can readily be pulled off. Furthermore, the coating compositions of this invention do not exhibit any odor whatever even after a long storage period and are completely insensitive to oxygen. Moreover, these coating compositions do not seep out or exude and do not have an oily feel.

The permanent flexural resistance or strength of the coating products of this invention was determined at 20° C. on cast films having a width of 20 mm. and a thickness of 3 mm. For this purpose, the film was clamped in two pairs of jaws opposing each other at a distance of 20 mm. By a suitable mechanism, one pair of the clamping jaws was rotated along a circular arc in the forward and reverse directions, so that the film was alternatingly bent at an angle of 90° and then straightened again, without being elongated during this procedure. The number of bending steps after which the film was ruptured was recorded. Five measurements were conducted on each product, the mean value of which was determined.

The viscosity of the products was examined by means of a rotational viscometer; the odor test was conducted after a long period of storage at room temperature.

The coating compositions may pass, during heating, from a solid state into a gelatinous condition, particularly if the compositions are produced with a customary commercial cellulose propionate of the desired type. Such customary cellulose propionate generally exhibits, in a 20% solution in acetone at 25° C., a viscosity of about 1,100 to about 4,000 centipoises. The gelatinous substances produced in the coating composition are liquefied only gradually at temperatures ranging above about 80° C. or even above about 100° C. Therefore, the coating of items is sometimes difficult at low temperatures, and, secondly, a relatively long melting time for the composition is required. The occurrence of such a gelatinous substance can be temporarily eliminated by heating the product to a sufficiently high temperature until it is in the liquid phase without any gel therein, and then cooling the product as rapidly as possible in order to freeze the random condition of the liquid phase. Thereafter, the product can once be melted without the formation of gelatinous substances. However, this product is cooled and crystallized subsequently under normal conditions, and the product may again form gelatinous masses during the renewed melting.

It has now been furthermore found, surprisingly, that the above-described gel formation can be entirely avoided by the use of a cellulose propionate, the viscosity of which, in a 20% solution in acetone at 25° C., is below about 500 centipoises. Use of this cellulose propionate results in advantages with respect to the melting behavior, since the compositions are already converted from the solid into the liquid phase when heated to temperatures of up to about 60° C., without the formation of gelatinous substance as an intermediary phase. In this regard, no disadvantages whatever are encountered. In particular, the coatings produced from these compositions are of permanent flexural strength, and, furthermore, the coatings are neither tacky nor sticky. These coatings are melted, however, substantially more rapidly than the compositions produced with the use of a cellulose propionate of a higher viscosity, and, besides, even at temperatures up to about 80° C., there is no danger whatever that a coating made of these compositions still contains residues of such gels and thus exhibits a non-uniform thickness.

Therefore, this invention is further directed to coating compositions containing cellulose propionate as described above, i.e., characterized in that the cellulose propionate exhibits a viscosity of less than about 500 centipoises, measured at 25° C. in a 20% solution in acetone.

For purposes of simplification, the use of the coating compositions for foodstuffs was emphasized in the above description; it is understood, of course, that it is also possible to employ these compositions for the coating of pharmaceutical preparations or other articles. The type of use and the thus-attained advantages are the same as in case of coating compositions for foodstuffs.

EXAMPLE 1

A coating composition was produced as follows: A commercially available, molecular-distilled fraction of stearic acid monoglycerides and palmitic acid monoglycerides was acetylated with acetic anhydride in a conventional manner at elevated temperatures; thereafter, the thus-formed acetic acid was distilled off under vacuum. An "acetoglyceride" was obtained having the following characteristic data: hydroxyl number 88; saponification number 320; acid number below 2; iodine value below 1; ascending melting point 38.8° C. This product (98.0 parts by weight) was melted; in the melt, 2.0 parts by weight of commercial cellulose propionate was dissolved at 90° C. The acetyl content of the cellulose propionate was 3.6% by weight, the propionyl content was 44.8% by weight, the content of acyl groups of more than 3 carbon atoms was less than 1% by weight, and the viscosity of a 20% solution in acetone at 25° C. was 2,700 centipoises.

The finished coating composition passed, during melting, from the solid phase into a gelatinous condition, the latter being converted into a liquid phase at temperatures of above 80° C.

EXAMPLE 1 (a)

In order to demonstrate the influence of differently substituted cellulose esters, respectively, 2.0 parts by weight of cellulose acetate, cellulose propionate, and cellulose acetate butyrate was dissolved in 98 parts by weight of the "acetoglyceride" produced in accordance with Example 1. These three solutions were cast into suitable molds, just like the pure "acetoglyceride." The solutions solidified therein into films of a width of 20 mm. and a thickness of 3 mm., the evaluation of which resulted in the following data:

| Additive (2% by Wt.) | Permanent Flexural Strength | Odor during storage at room temperature |
|---|---|---|
| None | Rupture after 5 flexings | Odorless after one-half year of storage |
| Cellulose acetate | Rupture after 4 flexings | Odorless after one-half year of storage |
| Cellulose acetate butyrate | Rupture after 75 flexings | Marked odor after |

| Cellulose propionate | Undamaged after 100 flexings | two weeks of storage Odorless after one year of storage |

EXAMPLE 1 (b)

The influence of the unsaturated proportions of the "acetoglyceride" employed becomes apparent from the following table. Respectively, 98 parts by weight of "acetoglyceride" of a varying iodine number is mixed with 2 parts by weight of cellulose propionate. The acetoglycerides were produced analogously to Example 1.

| Iodine Number of the Acetoglyceride | Odor of the Product During Storage at Room Temperature |
|---|---|
| 3 | Odorless after one year of storage |
| 12 | Odorless after eight weeks of storage |
| 50 | Marked odor after eight weeks of storage |

EXAMPLE 1 (c)

The following table demonstrates the influence of the quantity of cellulose ester. For this purpose, varous amounts of cellulose propionate were dissolved in an "acetoglyceride" produced according to Example 1. The viscosity of the melt at 65° C. and the permanent flexural strength of the films obtained were measured.

| Content of Cellulose Propionate (% by Wt.) | Viscosity at 65°C. (Centipoises) | Permanent Flexural Strength |
|---|---|---|
| 0 | — | Rupture after 5 flexings |
| 1 | 40 | Rupture after 330 flexings |
| 3 | 150 | Rupture after 240 flexings |
| 6 | 1200 | Rutpure after 200 flexings |
| 9 | >1200 | Rupture after 200 flexings |

EXAMPLE 2

A coating composition was produced in accordance with Example 1, with the only difference that propionic anhydride was employed in place of acetic anhydride to produce the glyceride. The evaluation gave excellent results and did not yield any essential differences in viscosity, permanent flexural strength, and odor stability.

EXAMPLE 3

A coating composition was produced as follows: A commercial, molecular-distilled fraction of stearic acid monogylcerides and palmitic acid monoglycerides was acetylated with acetic anhydride in a conventional manner at an elevated temperature; thereafter, the thus-produced acetic acid was distilled off under vacuum. An "acetoglyceride" having the following characteristics was obtained: hydroxyl number 88; saponification number 320; acid number below 2; iodine number below 1; ascending melting point 38.8° C. This product (96.0 parts by weight) was melted; in the melt, 4.0 parts by weight of cellulose propionate was dissolved at 90° C., the viscosity of which cellulose propionate was 200 centipoises at 25° C. in a 20% solution in acetone. The acetyl content of the cellulose propionate was 3.3% by weight, the propionyl content was 45.5% by weight, the content of acyl groups of more than 3 carbon atoms was less than 1% by weight. The coating composition obtained after the dissolution of the cellulose propionate solidified during cooling. This product, when heated, always passed over directly from the solid into the molten condition, without forming a gelatinous substance.

It will be appreciated that various mono- and diglycerides of fatty acids, particularly the saturated acids containing from 16 to 22 carbon atoms, acylated with either acetyl or propionyl groups to provide suitable glyceride base for the coating composition of this invention, may be employed. Also, mixtures of these glycerides may be used.

The iodine number of the above-mentioned glyceride below 12 can be reduced to 0, or nearly 0, meaning there is no, or nearly no, content of unsaturated groups in the glyceride.

In the cellulose propionate the contents of acetyl groups, hydroxyl and of such acyl groups of more than 3 up to 24 carbon atoms can also be reduced to 0 or nearly 0.

The viscosity of the cellulose propionate (at 25° C. in 20% by weight solution in acetone) can be reduced down to values of 60 centipoise.

The propionyl content of the cellulose propionate may be from 38 to 59% by weight, preferably from 42 to 51% by weight, in accordance with data given for other groups of it above.

We claim:

1. A coating composition with a glyceride base for producing odor-stable, meltable coatings having a high permanent flexural strength and exhibiting a low viscosity in the melt state and being particularly suitable for foodstuffs and pharmaceutical preparations, said composition containing at least one glyceride having an iodine number of below 12 and represented by the general formula:

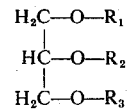

wherein at least one of the residues $R_1$, $R_2$, or $R_3$ represents an acetyl group or a propionyl group, at least another of these residues represents an acyl group of 16–24 carbon atoms, and any remaining one of the residues $R_1$, $R_2$, or $R_3$ is hydrogen; about 0.05 – about 12.0% by weight, of cellulose propionate having an acetyl content of less than about 6.0% by weight, a hydroxyl content of less than about 3.0% by weight, and a content of acyl groups of more than 3 carbon atoms of less than about 10% by weight.

2. The coating composition of claim 1, in which the cellulose propionate employed exhibits, at 25° C. in a 20% solution in acetone, a viscosity of less than 500 centipoises.

3. The coating composition of claim 1, in which the content of cellulose propionate is preferably from about 0.2 to about 9.0% by weight of the total weight of the composition.

4. The coating composition of claim 1, in which the glycerides comprise a molecular-distilled fraction of stearic acid monoglycerides and palmitic acid monoglycerides acetylated to have a hydroxyl number of 88, a saponification number of 320, an acid number below 2, and an iodine value below 1.

5. The coating composition of claim 1, in which a mixture of different glycerides represented by said general formula is contained therein.

6. The coating composition of claim 1, in which said glyceride is selected from the group consisting of mono- and di-glycerides of saturated fatty acids containing from 16 to 22 carbon atoms acylated with acetyl or propionyl groups.

7. The coating composition of claim 1, in which said glyceride is admixed with said cellulose propionate.

8. The coating composition of claim 7, in which said glyceride has an iodine number below 3.

9. The coating composition of claim 1, in which said glyceride has a hydroxyl number of 88, a saponification number of 320, an acid number below 2, an iodine number below 1, and an ascending melting point of 38.8° C., and said cellulose propionate has an acetyl content of 3.6% by weight, a propionyl content of 44.8% by weight and a content of acyl groups of more than 3 carbon atoms less than 1% by weight; said composition consisting essentially of 98.0 parts by weight of said glyceride and 2.0 parts by weight of said cellulose propionate.

10. The coating composition of claim 1, in which said glyceride has a hydroxyl number of 88, a saponification number of 320, an acid number below 2, an iodine number below 1, and an ascending melting point of 38.8° C., and said cellulose propionate has an acetyl content of 3.3% by weight, a propionyl content of 45.5% by weight and a content of acyl groups of more than 3 carbon atoms less than 1% by weight; said composition consisting essentially of 96.0 parts by weight of said glyceride and 4.0 parts by weight of said cellulose propionate.

11. The coating composition of claim 1, in which said cellulose propionate has a propionyl content of from 38.0 to 59.0% by weight.

12. A coating composition with a glyceride base for producing odor-stable, meltable coatings having a high permanent flexural strength and exhibiting a low viscosity in the melt state and being particularly suitable for foodstuffs and pharmaceutical preparations, said composition consisting essentially of at least one glyceride having an iodine number of below 12, wherein said glyceride is represented by the general formula:

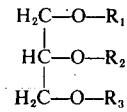

wherein at least one of the residues $R_1$, $R_2$, or $R_3$ represents an acetyl group or a propionyl group, at least another of these residues represents an acyl group of 16 –24 carbon atoms, and any remaining one of the residues $R_1$, $R_2$, or $R_3$ is hydrogen; about 0.05 – about 12.0% by weight, of cellulose propionate having an acetyl content of less than about 6.0% by weight, a hydroxyl content of less than about 3.0% by weight, and a content of acyl groups of more than 3 carbon atoms of less than about 10% by weight.

13. The coating composition of claim 12, in which the cellulose propionate exhibits at 25° C. in a 20% solution in acetone, a viscosity of less than 500 cps and the content of cellulose propionate is from about 0.2 to about 9.0% by weight of the total weight of the composition.

* * * * *